US009863792B2

(12) United States Patent
Ootake et al.

(10) Patent No.: US 9,863,792 B2
(45) Date of Patent: Jan. 9, 2018

(54) ENCODER HAVING LIQUID-TIGHT STRUCTURE

(71) Applicant: FANUC CORPORATION, Minamitsuru-gun, Yamanashi (JP)

(72) Inventors: Nobuyuki Ootake, Yamanashi (JP); Keisuke Imai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/233,155

(22) Filed: Aug. 10, 2016

(65) Prior Publication Data

US 2017/0059369 A1 Mar. 2, 2017

(30) Foreign Application Priority Data

Aug. 28, 2015 (JP) ................................. 2015-169124

(51) Int. Cl.
| | | |
|---|---|---|
| *G01D 5/00* | (2006.01) | |
| *G01D 5/34* | (2006.01) | |
| *G01D 11/24* | (2006.01) | |

(52) U.S. Cl.
CPC ............. *G01D 11/24* (2013.01); *G01D 5/00* (2013.01)

(58) Field of Classification Search
CPC . G01D 11/24; G01D 5/34; G01D 5/00; G01D 5/2415
USPC .......................................................... 33/1 N
See application file for complete search history.

(56) References Cited

U.S. PATENT DOCUMENTS

| | | | | |
|---|---|---|---|---|
| 2002/0145108 A1* | 10/2002 | Rodi | .................. | G01D 5/34738 250/231.14 |
| 2008/0120850 A1* | 5/2008 | Brandl | ................. | G01D 11/245 33/1 PT |
| 2008/0120851 A1* | 5/2008 | Brandl | ..................... | G01D 5/20 33/1 PT |
| 2010/0180664 A1* | 7/2010 | Wilhelmy | ............... | F16C 19/52 73/7 |
| 2013/0146755 A1* | 6/2013 | Wagner | .................... | B23Q 7/06 250/231.13 |
| 2013/0214140 A1* | 8/2013 | Riepertinger | ........ | G01D 11/245 250/231.13 |
| 2014/0338204 A1* | 11/2014 | Meyer | ................... | F16C 33/745 33/1 PT |
| 2016/0056691 A1* | 2/2016 | Hale | ...................... | H02K 11/21 310/68 B |

FOREIGN PATENT DOCUMENTS

JP         U 3188676         1/2014

* cited by examiner

*Primary Examiner* — Lisa Caputo
*Assistant Examiner* — Jamel Williams
(74) *Attorney, Agent, or Firm* — RatnerPrestia

(57) ABSTRACT

An encoder able to maintain liquid-tightness over a long period of time. The encoder is provided with a housing unit holding component parts of the encoder. The housing unit is formed by a housing and a cover closing an opening part of the housing. At a boundary part of the housing and the cover, an O-ring is placed. The housing is formed with a guide groove at the outside in the radial direction from the O-ring and a discharge guide groove communicated with the guide groove and opening toward the outside in the radial direction. The cover is formed with a ring-shaped guide projection projecting out toward the guide groove at a position corresponding to the guide groove.

4 Claims, 6 Drawing Sheets

ENCODER HAVING LIQUID-TIGHT STRUCTURE

BACKGROUND OF THE INVENTION

1. Field of the Invention

The present invention relates to an encoder used together with an electric motor.

2. Description of the Related Art

An encoder is used for detecting an angular position of a rotary body which is directly or indirectly driven by an electric motor. To prevent the entry of foreign matter, the component parts of the encoder are held inside a housing unit provided with a sealing member (see Japanese Utility Model Registration No. 3188676). If an electric motor is used for driving a spindle or travel axis of a machine tool, the encoder will be exposed to a cutting fluid or washing solution. The housing unit holding the component parts of the encoder has a liquid-tight structure protecting these component parts from the cutting fluid etc. In particular, at a boundary part of the housing and cover forming the housing unit, an O-ring or other sealing member is provided.

However, if a cutting fluid or washing solution with a strong attack property deposits and remains in the gap between the housing and the cover, the housing or cover is liable to gradually corrode and the liquid-tightness is liable to be impaired.

SUMMARY OF INVENTION

An encoder able to maintain liquid-tightness over a long period of time is being sought.

According to a preferred embodiment, there is provided a rotary encoder including a housing having an opening part, a cover attached to the housing so as to close the opening part, a detecting part held in a housing unit formed by the housing and the cover and detecting an angular position of a rotary shaft, a ring-shaped sealing member arranged so as to surround the opening part at a boundary part of the housing and the cover, a ring-shaped guide groove formed at one of the housing and the cover at the boundary part positioned at the outside in the radial direction from the sealing member, a discharge groove communicating with the guide groove and opening toward the outside in the radial direction, and a ring-shaped guide projection formed at the other of the housing and the cover at a position corresponding to the guide groove and projecting out toward the guide groove.

According to a preferred embodiment, the discharge groove is formed so as to open toward the bottom in the vertical direction.

According to a preferred embodiment, the guide groove and the discharge groove are formed so as to become gradually larger in groove depths toward the outside in the radial direction.

According to a preferred embodiment, a surface of the guide projection facing the outside in the radial direction is inclined so as to form an obtuse angle.

BRIEF DESCRIPTION OF DRAWINGS

These and other objects, features, and advantages of the present invention will become clearer by referring to the detailed description of illustrative embodiments of the present invention shown in the attached drawings.

DETAILED DESCRIPTION

Below, embodiments of the present invention will be explained with reference to the attached drawings. The component elements in the illustrated embodiments are suitably changed in scale for assisting understanding of the present invention. Further, the same or corresponding component elements use the same reference notations.

Figure 1:
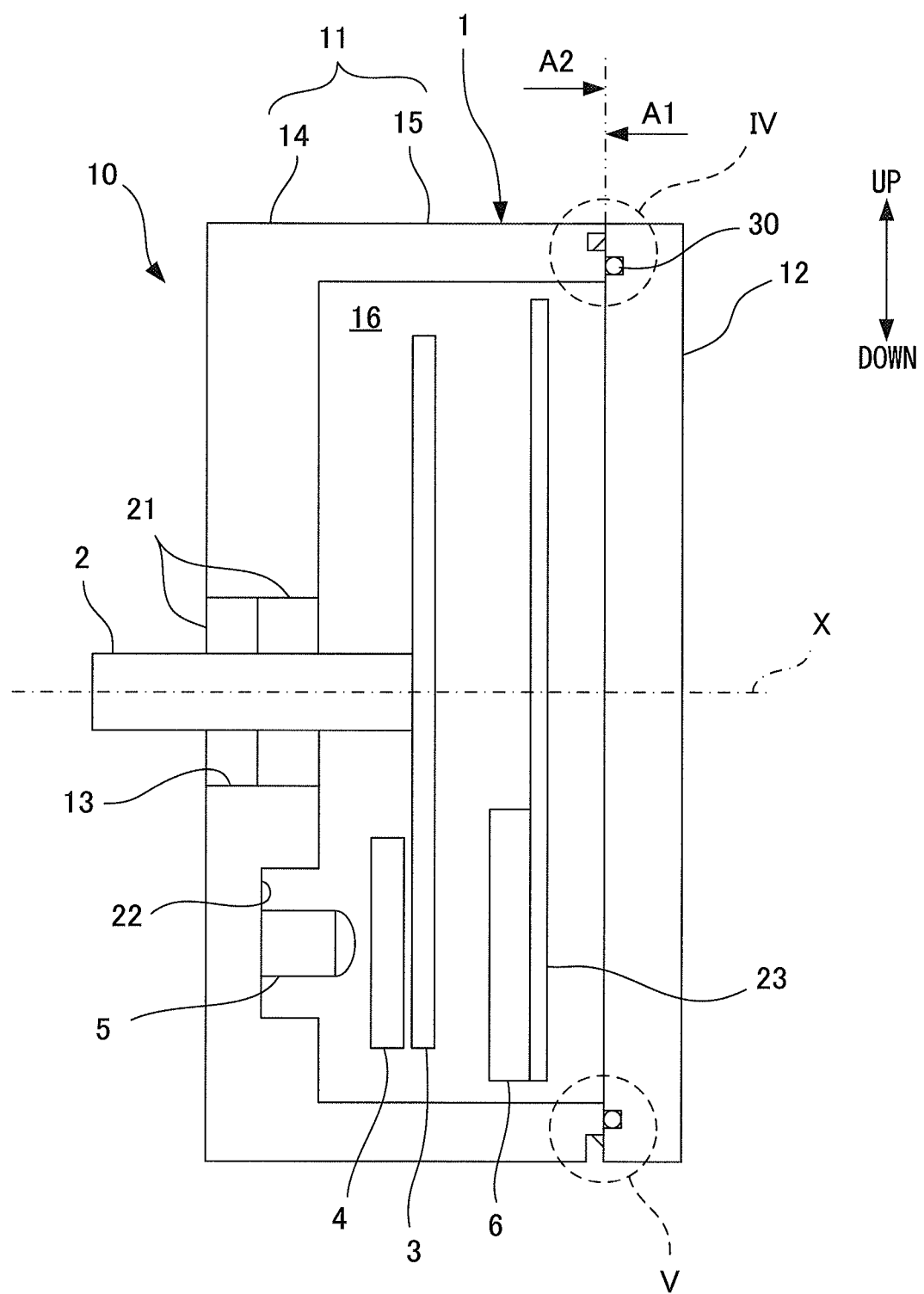
FIG. 1 is a schematic view showing an example of the configuration of an encoder according to one embodiment.

Referring to FIG. 1 to FIG. 5, an encoder 10 according to one embodiment will be explained. FIG. 1 schematically shows the overall configuration of the encoder 10. Below, an encoder 10 configured by a transmission type optical encoder will be explained, but the present invention is not limited to a specific type of encoder and can also be applied to a reflection type optical encoder or a magnetic type encoder.

The encoder 10 includes a housing unit 1, a rotary shaft 2, a rotary slit plate 3, a fixed slit plate 4, a light emitting part 5, and a light receiving part 6. The encoder 10 is a rotary encoder detecting an angular position of the rotary shaft 2 which rotates directly or indirectly receiving drive power from a not shown electric motor. The encoder 10 is used in a state with the rotary shaft 2 oriented in the horizontal direction. That is, the up-down direction of FIG. 1 corresponds to the actual up-down direction in the state of use of the encoder 10.

The housing unit 1 is a hollow member formed by assembling a housing 11 and cover 12. The housing 11 has a base part 14 in which a center hole 13 is formed for insertion of the rotary shaft 2 and a circumferential wall 15 extending substantially vertical from the base part 14. The housing 11 has a substantially circular opening part formed by the circumferential wall 15. The cover 12 is a plate-shaped member closing the opening part and is attached by bolts or other known fastening means to the circumferential wall 15 of the housing 11.

The rotary slit plate 3, fixed slit plate 4, light emitting part 5, and light receiving part 6 are held in an inside space 16 formed by the housing unit 1. At the boundary part of the housing 11 and cover 12, a ring-shaped sealing member, for example, an O-ring 30, is placed so as to surround the opening part of the housing 11. The O-ring 30 acts as a sealing member preventing foreign matter from entering the inside space 16 of the housing unit 1.

The rotary shaft 2 is supported so that it can rotate about the axis X by a bearing 21 attached to the center hole 13 passing through the base part 14 of the housing 11. The rotary shaft 2 passes through the center hole 13 and extends to the inside space 16 of the housing unit 1. At the end part of the rotary shaft 2, the rotary slit plate 3 is fastened. The rotary slit plate 3 rotates about the axis X together with the rotary shaft 2.

At the base part 14 of the housing 11, a recessed part 22 is formed for placing the light emitting part 5. The light emitting part 5 includes a light emitting diode or other light source and emits light toward the rotary slit plate 3. The fixed slit plate 4 is placed between the light emitting part 5 and the rotary slit plate 3. The fixed slit plate 4 is formed with at least one slit and blocks part of the light emitted from the light emitting part 5 to generate parallel light.

The rotary slit plate 3 is formed with slits in the circumferential direction about the axis X at a predetermined pitch. Due to this, blocking parts which block the light and passing parts which pass the light are formed differently from each other.

The light receiving part 6 includes a photodiode or phototransistor or other light receiving element mounted on a circuit board 23 and outputs an electrical signal corresponding to the light passing through the rotary slit plate 3. In this way, the encoder 10 includes the light emitting part 5 and the light receiving part 6 and detects the angular position of the rotary shaft 2 based on the electrical signal output from the light receiving part 6 based on part of the light emitted from the light emitting part 5, so in this case, the light emitting part 5 and the light receiving part 6 act as a detecting part detecting the angular position of the rotary shaft 2.

Figure 2:
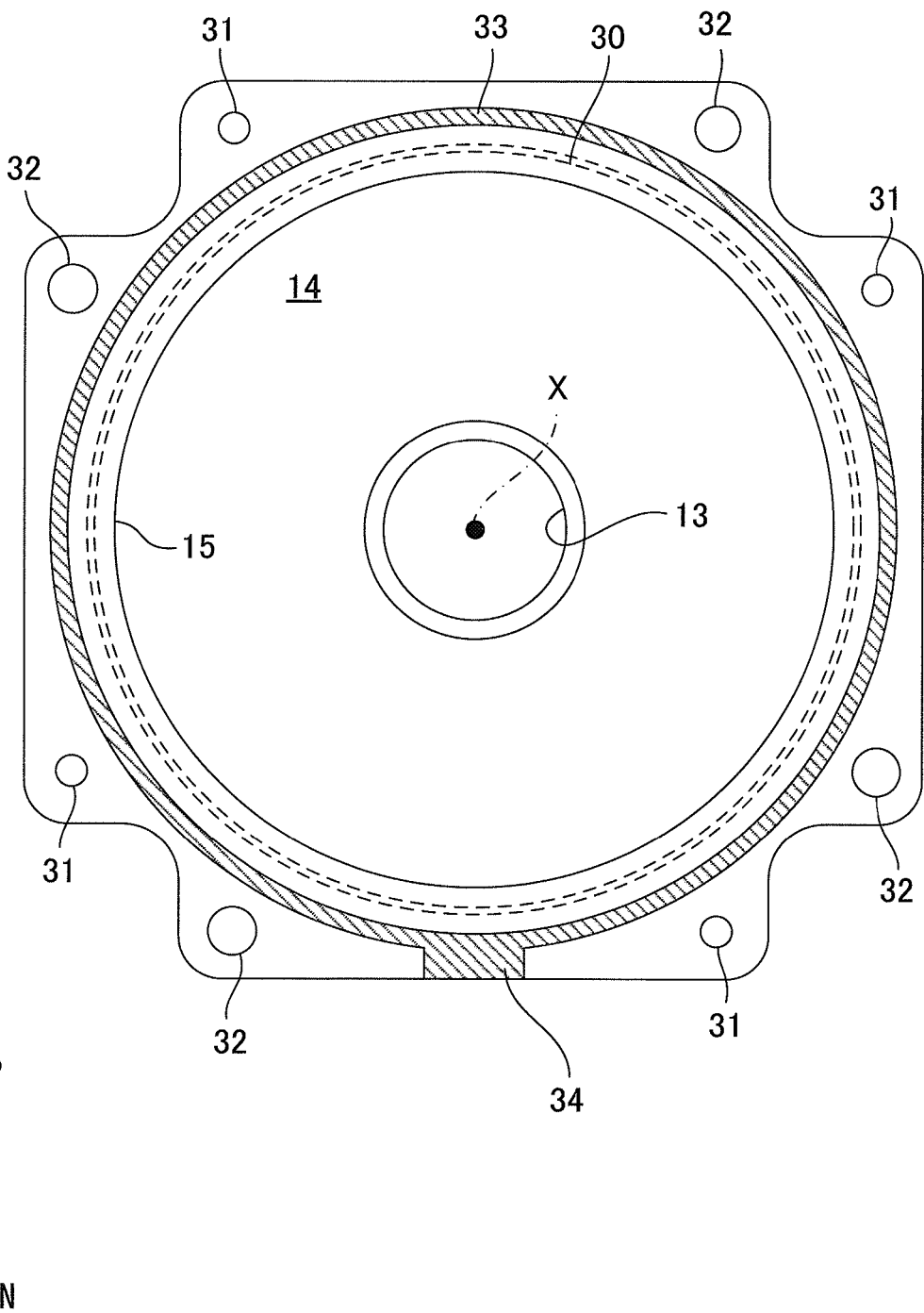
FIG. 2 is a view showing an example of the configuration of a housing.

FIG. 2 is a view of the housing 11 seen from the arrow A1 of FIG. 1. The housing 11 generally has a contour formed by cutting off rectangular parts from the four corners of the square shape. At the peripheral edges of the housing 11, screw holes 31 for screwing in the cover 12 and through holes 32 for insertion of bolts for fastening the encoder 10 to the electric motor etc. are formed.

FIG. 2 shows the position where the O-ring 30 is placed by broken lines. At the outside in the radial direction from the O-ring 30, a ring-shaped guide groove 33 is formed over the entire circumference of the housing 11 around the axis X. Further, at the bottom end of the housing 11, a discharge groove 34 communicating with the guide groove 33 and opening toward the bottom in the vertical direction is formed. In FIG. 2, the guide groove 33 and discharge groove 34 are shown by hatching.

Figure 3:
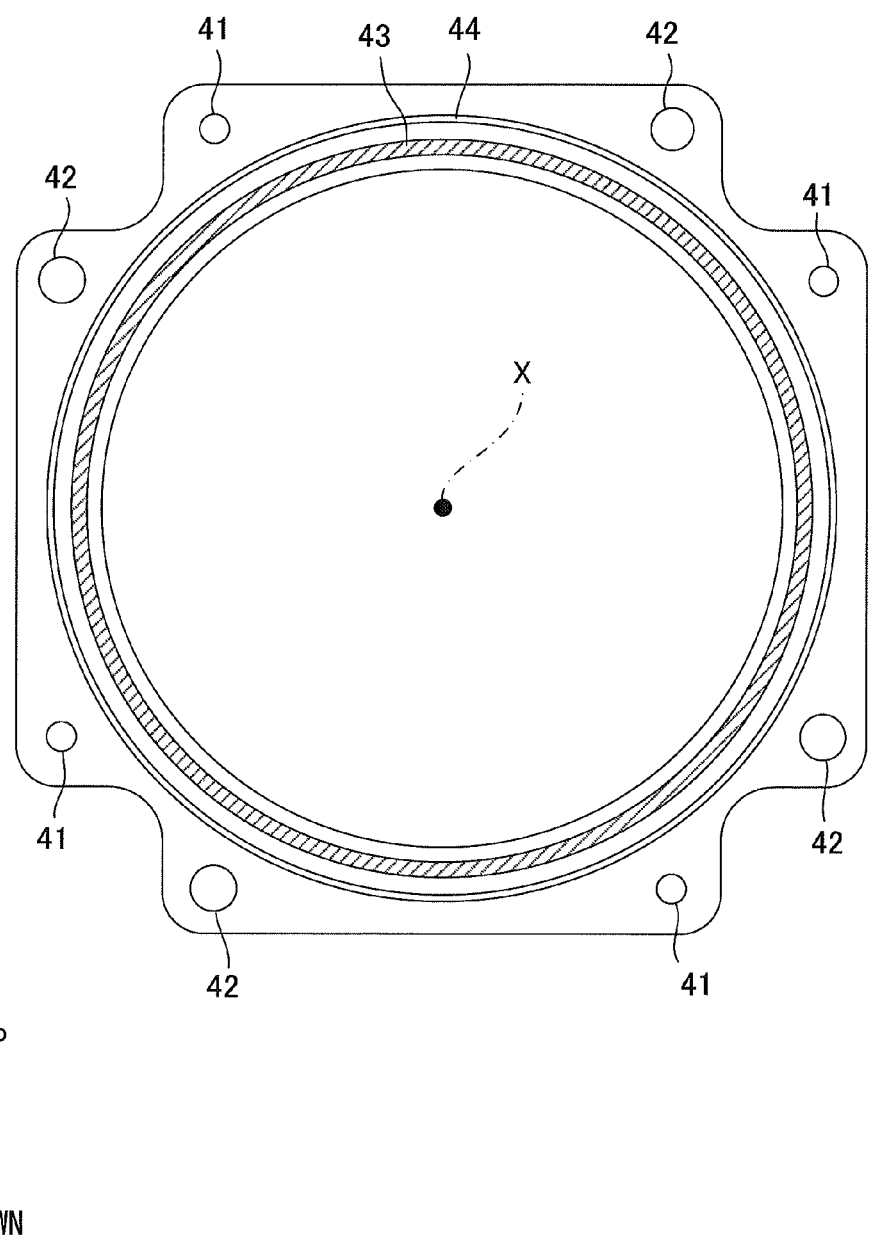
FIG. 3 is a view showing an example of the configuration of a cover.

FIG. 3 is a view of the cover 12 as seen from the arrow A2 of FIG. 1. The cover 12 has a contour corresponding to the housing 11. The cover 12 is formed with through holes 41 at positions corresponding to the screw holes 31 of the housing 11 and is formed with through holes 42 at positions corresponding to the through holes 32 of housing 11.

The cover 12 is formed with a ring-shaped groove 43 for placement of the O-ring 30. At the outside in the radial direction from the ring-shaped groove 43, a ring-shaped guide projection 44 is formed enabling the guide groove 33 and discharge groove 34 of the housing 11 to cooperate and discharge the cutting fluid or washing solution or other liquid to the outside. The guide projection 44 is formed at a position corresponding to the guide groove 33 of the housing 11 and is formed so as to project out toward the guide groove 33.

Figure 4:
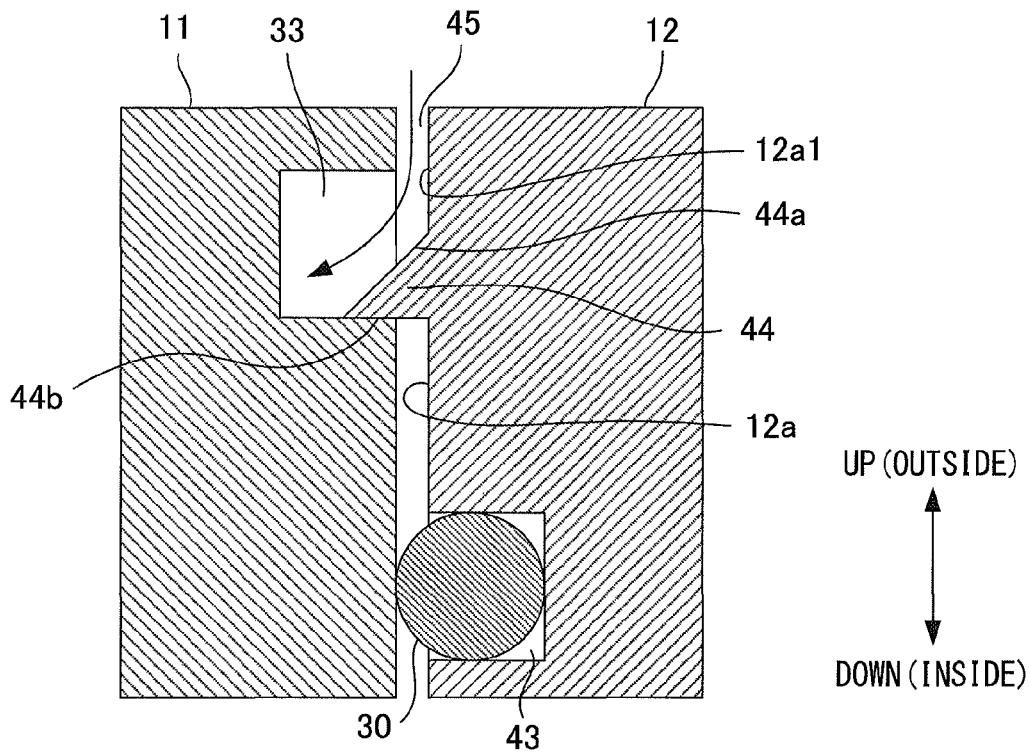
FIG. 4 is an enlarged view showing a boundary part of the housing and cover.

FIG. 4 shows enlarged the region IV enclosed by broken lines in FIG. 1. That is, FIG. 4 shows the boundary part of the housing 11 and the cover 12 at the top part in the vertical direction. As shown in FIG. 4, the guide projection 44 of the cover 12 projects out from the inner surface 12a of the cover 12 toward the housing 11 side and extends to the inside of the guide groove 33. Further, the outer circumferential surface 44a of the guide projection 44 facing the outside in the radial direction is inclined so as to form an obtuse angle with the inner surface 12a1 of the cover 12 positioned at the outside in the radial direction from the guide projection 44.

The inner circumferential surface 44b of the guide projection 44 facing the inside in the radial direction extends roughly perpendicularly to the inner surface of the cover 12 so as to contact the facing surface of the guide groove 33.

The liquid entering the gap 45 between the housing 11 and the cover 12, as shown by the arrow in FIG. 4, is guided by the guide projection 44 to the guide groove 33. The guide groove 33 is, as shown in FIG. 2, formed over the entire circumference of the housing 11, so the liquid runs through the ring-shaped guide groove 33 and moves to the bottom in the vertical direction due to the action of gravity.

Figure 5:
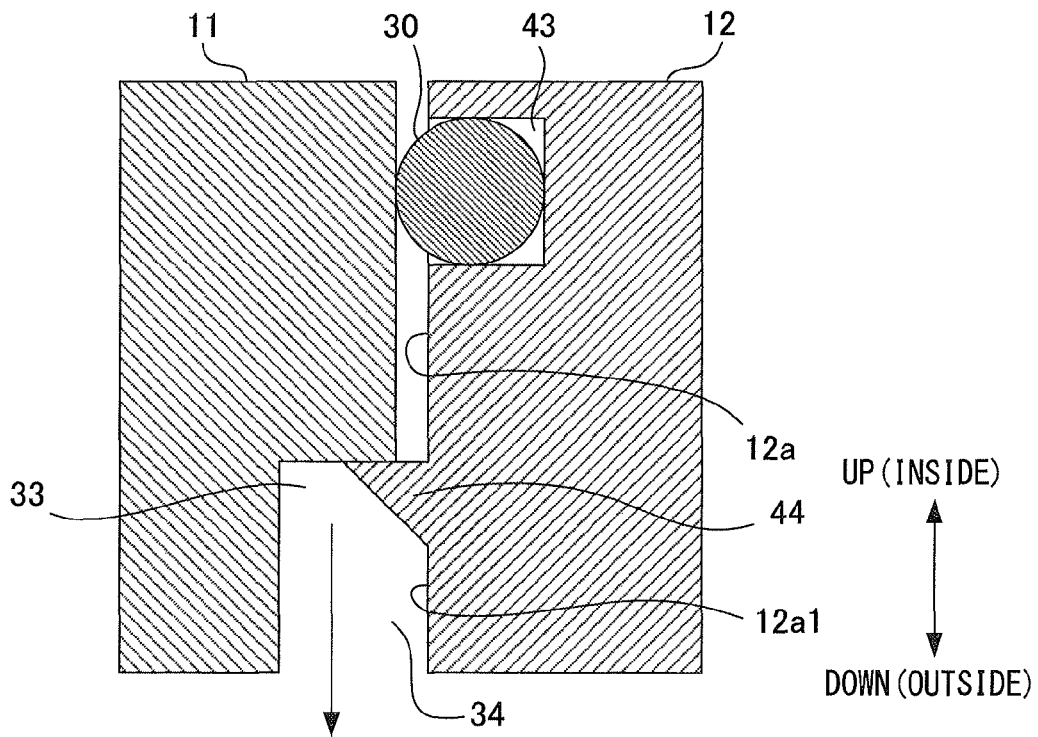
FIG. 5 is an enlarged view showing a boundary part of the housing and cover.

FIG. 5 shows enlarged the region V surrounded by the broken lines in FIG. 1. That is, FIG. 5 shows the boundary part of the housing 11 and cover 12 at the bottom part in the vertical direction. The guide groove 33, as illustrated, is communicated with the discharge groove 34 and opens toward the bottom in the vertical direction. Therefore, liquid moving passing through the gap 45 and guide groove 33 passes through the discharge groove 34 due to the action of gravity and is discharged to the outside of the encoder 10.

Figure 8:
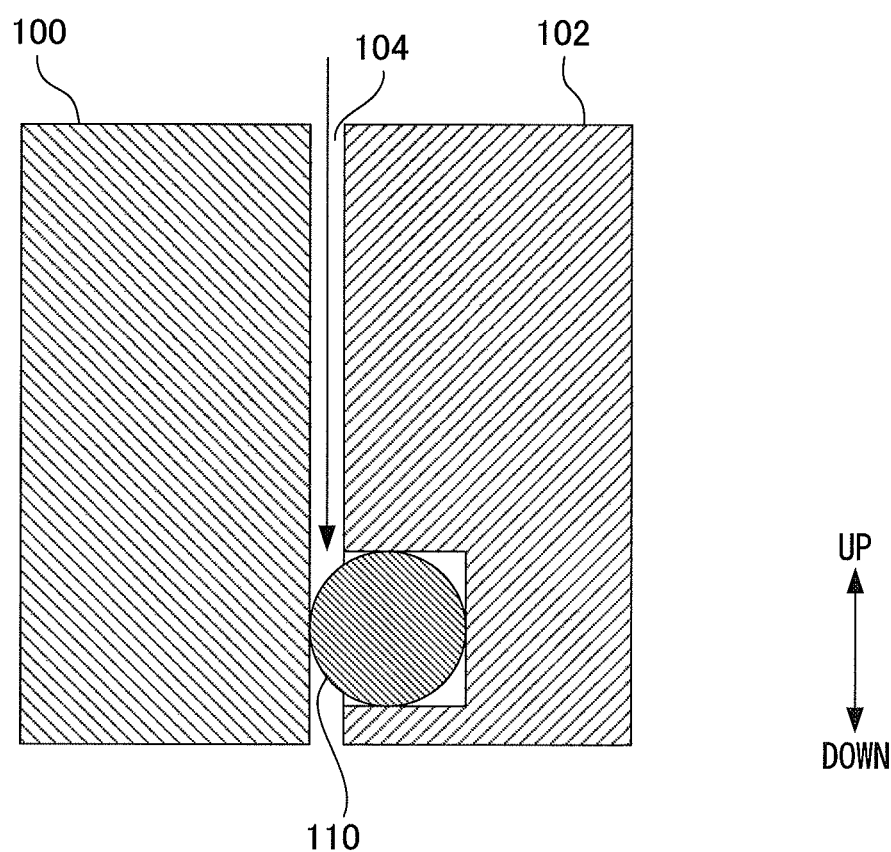
FIG. 8 is an enlarged view showing a boundary part of the housing and cover in an encoder according to a comparative example.

As opposed to this, in the case of the encoder according to the comparative example such as shown in FIG. 8, liquid entering the gap 104 between the housing 100 and cover 102 is prevented by the O-ring 110 from entering the inside of the housing unit, but sometimes remains near the O-ring 110. For example, when the liquid is cutting fluid diluted by water, the water content evaporates along with the elapse of time whereby high concentration cutting fluid remains at the gap 104. If a liquid having an attacking property remains in the gap 104 over a long period of time, the housing 100 or cover 102 is liable to gradually corrode, the gap 104 is liable to become locally larger, and the desired liquid-tightness is liable to be impaired.

According to the present embodiment, even if cutting fluid or washing solution or other liquid enters the gap 45 between the housing 11 and cover 12, the liquid is guided by the guide projection 44 into the guide groove 33 and further passes through the guide groove 33 to be discharged to the outside from the discharge groove 34 downward in the vertical direction. Therefore, a liquid having a strongly attacking nature can be prevented from remaining in the gap 45. As a result, a highly reliable encoder which prevents corrosion of the housing 11 or cover 12 and can maintain the liquid-tightness over a long period of time can be provided.

Note that, the guide groove 33 and discharge groove 34, and the guide projection 44 are in a mutually complementary relationship. Therefore, opposite to the illustrated embodiment, the housing 11 may be formed with the ring-shaped groove 43 and guide projection 44 and the cover 12 may be formed with the guide groove 33 and discharge groove 34.

Figure 6:
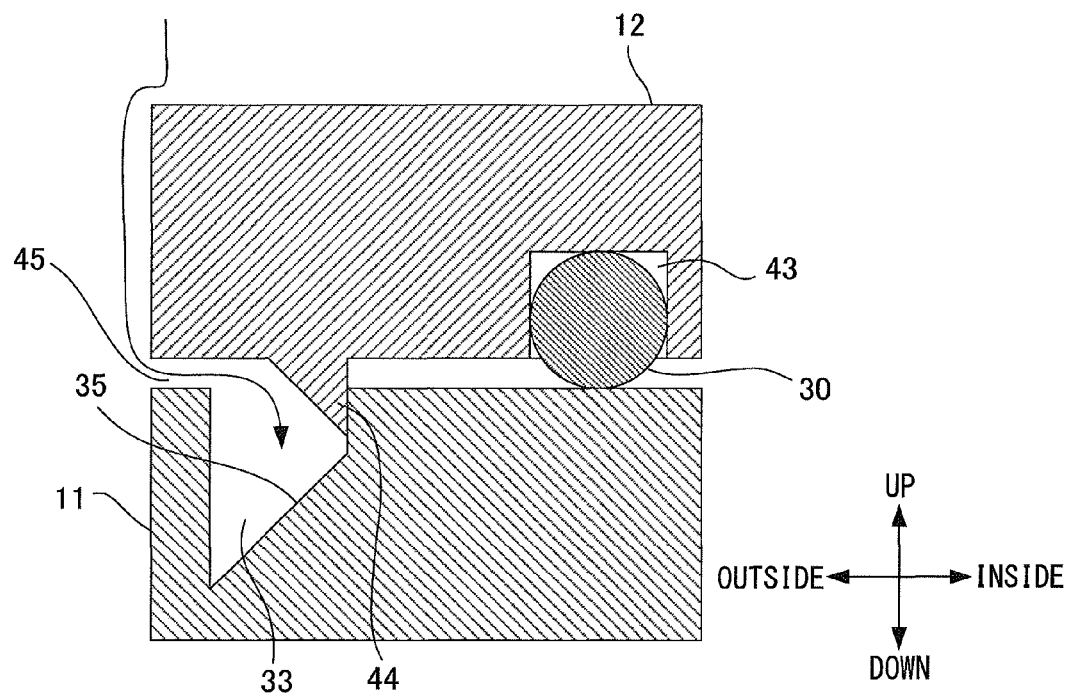
FIG. 6 is an enlarged view showing a boundary part of the housing and cover in an encoder according to another embodiment.
Figure 7:
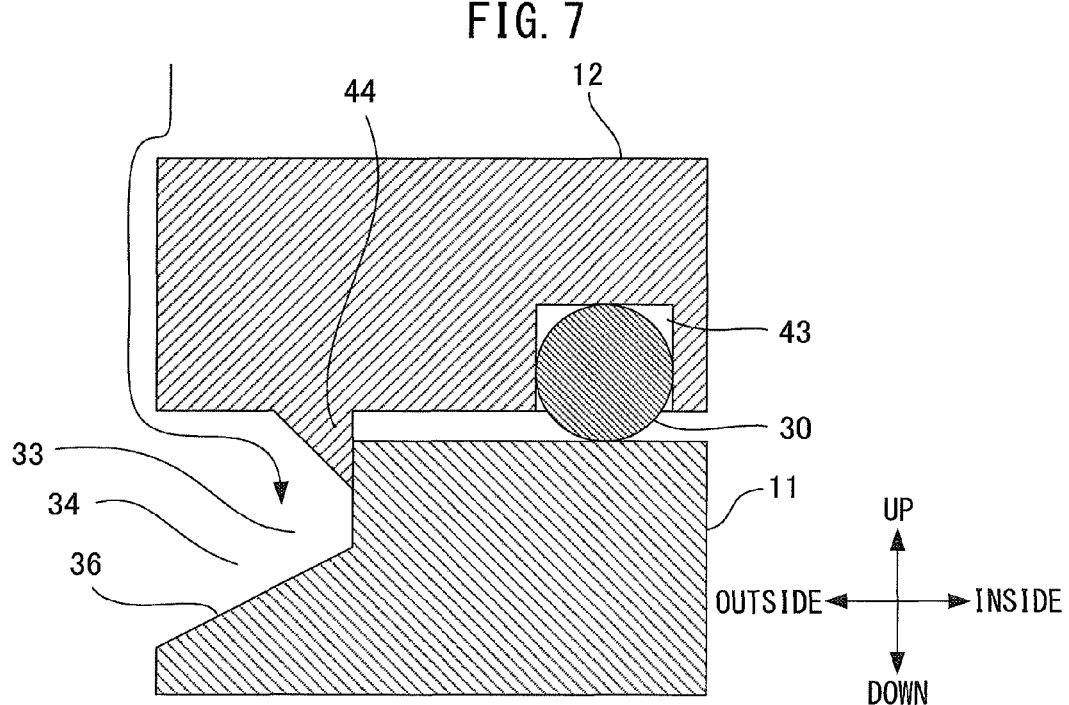
FIG. 7 is an enlarged view showing a boundary part of the housing and cover in an encoder according to another embodiment.

Referring to FIG. 6 and FIG. 7, an encoder according to another embodiment will be explained. In the above-mentioned embodiments, a configuration was employed in which liquid was discharged to the outside of the encoder through a discharge groove 34 formed at the bottom in the vertical direction. However, the method of placement of the encoder may be changed according to need. For example, sometimes the encoder is set so that the rotary shaft faces the vertical direction. Below, points different from the above-mentioned embodiments will be explained.

FIG. 6 and FIG. 7 are views respectively corresponding to FIG. 4 and FIG. 5. However, in the present embodiment, the housing 11 and cover 12 are assembled so as to be superposed in the up-down direction.

In this case, the guide groove 33 is arranged in the horizontal direction, so the liquid is liable to remain in the guide groove 33 without being guided to the discharge groove 34. Therefore, in the present embodiment, the depth of the guide groove 33 formed in the housing 11 is changed so as to guide the liquid to the discharge groove 34.

Specifically, as shown in FIG. 6, the bottom surface 35 of the guide groove 33 is inclined so that the depth of the guide groove 33 (dimension along vertical direction) gradually becomes larger from the inside in the radial direction toward the outside. Therefore, as shown by the arrow mark in FIG. 6, the liquid entering through the gap 45 is guided by the guide projection 44 to the guide groove 33 and is further collected at the outside in the radial direction from the guide groove 33.

Furthermore, if referring to FIG. 7, the discharge groove 34 has a bottom surface 36 inclined so that the depth becomes greater from the inside in the radial direction to the outside. Therefore, liquid entering through the gap 45 is guided to the guide groove 33, runs through the discharge groove 34 opening toward the outside in the radial direction, and is discharged to the outside of the encoder 10. In the case of the present embodiment, a plurality of discharge grooves 34 may be formed in the circumferential direction around the axis X at a predetermined pitch. For example, a total of four discharge grooves 34 may be formed at 90 degree angles.

According to the present embodiment, even when the housing 11 and cover 12 are arranged so as to be superposed in the vertical direction, the liquid entering through the gap 45 can be discharged to the outside of the encoder 10. Therefore, it is possible to provide a highly reliable encoder 10 which can maintain liquid-tightness over a long period of time.

Above, various embodiments of the present invention were explained, but a person skilled in the art would recognize that other embodiments as well may be used to realize the actions and effects intended by the present invention. In particular, the component elements of the embodiments explained above can be deleted or replaced without departing from the scope of the present invention and known means can be further added. Further, the fact that the features of the plurality of embodiments which are explicitly or implicitly disclosed in this specification can also be freely combined so as to work the present invention is self evident to a person skilled in the art.

According to the encoder according to the present invention, a guide groove and discharge groove are formed at one of the housing and cover and a guide projection is formed at the other. Due to this, cutting fluid or washing solution or other liquid passes through the guide groove and discharge groove and is discharged to the outside of the encoder. The liquid is prevented from remaining in the gap between the housing and the cover, so the liquid-tightness of the housing can be maintained over a long period of time.

What is claimed is:

1. A rotary encoder comprising:
   a housing having an opening part,
   a cover attached to said housing so as to close said opening part,
   a detecting part held in a housing unit formed by said housing and said cover and detecting an angular position of a rotary shaft,
   a ring-shaped sealing member arranged so as to surround said opening part at a boundary part of said housing and said cover,
   a ring-shaped guide groove formed at one of said housing and said cover at said boundary part positioned at the outside in the radial direction from said sealing member,
   a discharge groove communicating with said guide groove and opening toward the outside in the radial direction, and
   a ring-shaped guide projection formed at the other of said housing and said cover at a position corresponding to said guide groove and projecting out toward said guide groove.

2. The rotary encoder according to claim 1, wherein said discharge groove is formed so as to open toward the bottom in the vertical direction.

3. The rotary encoder according to claim 1, wherein said guide groove and said discharge groove are formed so as to become gradually larger in groove depths toward the outside in the radial direction.

4. The rotary encoder according to claim 1, wherein a surface of said guide projection facing the outside in the radial direction is inclined so as to form an obtuse angle.

* * * * *